United States Patent [19]
Yoshimura et al.

[11] Patent Number: 5,818,983
[45] Date of Patent: Oct. 6, 1998

[54] OPTICAL INTEGRATED CIRCUIT, OPTICAL CIRCUIT WAVEGUIDE DEVICE AND PROCESS FOR ORIENTED, SELECTIVE GROWTH AND FORMATION OF ORGANIC FILM

[75] Inventors: Tetsuzo Yoshimura; Satoshi Tatsuura; Wataru Sotoyama; Yasuhiro Yoneda; Katsusada Motoyoshi; Koji Tsukamoto; Takeshi Ishitsuka; Shigenori Aoki, all of Kawasaki, Japan

[73] Assignee: Fujitsu Limited, Kanagawa, Japan

[21] Appl. No.: 618,154

[22] Filed: Mar. 19, 1996

Related U.S. Application Data

[63] Continuation-in-part of Ser. No. 28,550, Mar. 8, 1993, abandoned.

[30] Foreign Application Priority Data

| Mar. 6, 1992 | [JP] | Japan | 04-048961 |
| Mar. 11, 1992 | [JP] | Japan | 04-052206 |
| Jun. 18, 1992 | [JP] | Japan | 04-159350 |
| Jul. 7, 1992 | [JP] | Japan | 04-179909 |
| Jul. 16, 1992 | [JP] | Japan | 04-189554 |
| Mar. 20, 1995 | [JP] | Japan | 7-060847 |

[51] Int. Cl.[6] ............................................. G02B 6/12
[52] U.S. Cl. ..................... 385/14; 385/2; 385/8; 385/15; 385/16; 385/39; 385/40; 385/130; 385/131; 385/122; 385/141; 385/142; 385/144
[58] Field of Search ...................... 385/2, 3, 8, 9, 385/10, 14, 15, 16, 17, 37, 39, 40, 41, 42, 49, 130, 131, 132, 122, 141, 142, 143, 144, 145

[56] References Cited

U.S. PATENT DOCUMENTS

| 3,885,856 | 5/1975 | Ostrowsky et al. | 359/15 X |
| 4,003,632 | 1/1977 | Komiya et al. | 385/131 X |
| 4,236,785 | 12/1980 | Papuchon et al. | 385/122 X |
| 4,717,228 | 1/1988 | Thylen | 385/14 X |
| 4,767,169 | 8/1988 | Teng et al. | 385/2 X |
| 4,783,136 | 11/1988 | Elman et al. | 385/130 |
| 4,798,426 | 1/1989 | Malcolm et al. | 359/15 X |
| 5,005,933 | 4/1991 | Shimuzu | 385/122 X |
| 5,009,483 | 4/1991 | Rockwell, III | 385/2 X |
| 5,039,186 | 8/1991 | Man et al. | 385/122 |
| 5,045,364 | 9/1991 | Fang | 385/122 |
| 5,108,201 | 4/1992 | Matsuura et al. | 385/143 |
| 5,138,687 | 8/1992 | Horie et al. | 385/129 |
| 5,140,652 | 8/1992 | Diemeer | 385/2 |
| 5,182,783 | 1/1993 | Bosc et al. | 385/123 |
| 5,207,862 | 5/1993 | Baker et al. | 385/130 X |
| 5,317,666 | 5/1994 | Agostinelli et al. | 385/122 |

OTHER PUBLICATIONS

"Epitaxial Growth of Aligned Polydiacetylene Films on Anisotropic Orienting Polymers," J.S. Patel et al., Applied Physics Letters, 56(2), Jan. 8, 1990, pp. 131–133.

"Highly Oriented Polydiacetylene Films by Vacuum Deposition," Tatsuo Kanetake et al., Applied Physics Letters, 51 (23), Oct. 5, 1987.

*Primary Examiner*—Brian Healy
*Attorney, Agent, or Firm*—Nikaido, Marmelstein Murray & Oram LLP

[57] ABSTRACT

An optical integrated circuit wherein the waveguide network is constructed of a passive waveguide and a functional material is used on the functional portions, an optical circuit device which uses transparent electrodes, an optical switch which uses transparent electrodes and a functional portion made of a non-linear optical material, a matrix optical switch which converts inputted and outputted light at an electrical/ optical converter element, and an optical integrated circuit or optical circuit device prepared by selective vapor growth of a functional material on desired regions, as well as an organic film growth process by which an organic film is selectively grown on recess walls and an organic film formation process whereby organic CVD or MLD is performed using a chamber divided into multiple regions.

50 Claims, 16 Drawing Sheets

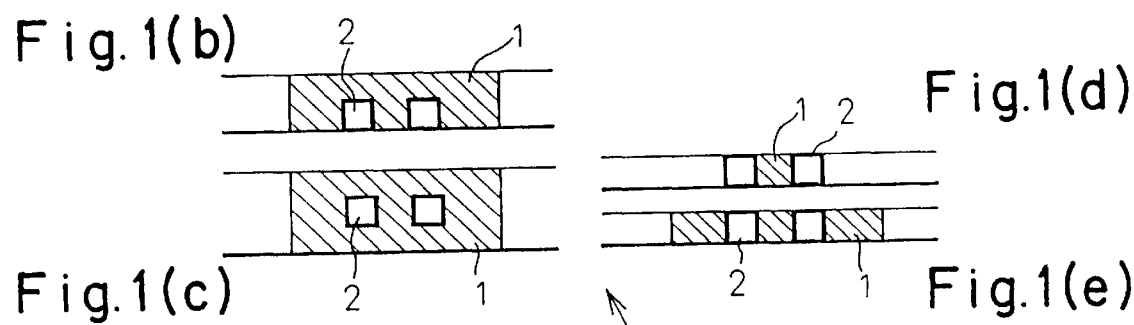
Fig.1(b) Fig.1(d)
Fig.1(c) Fig.1(e)
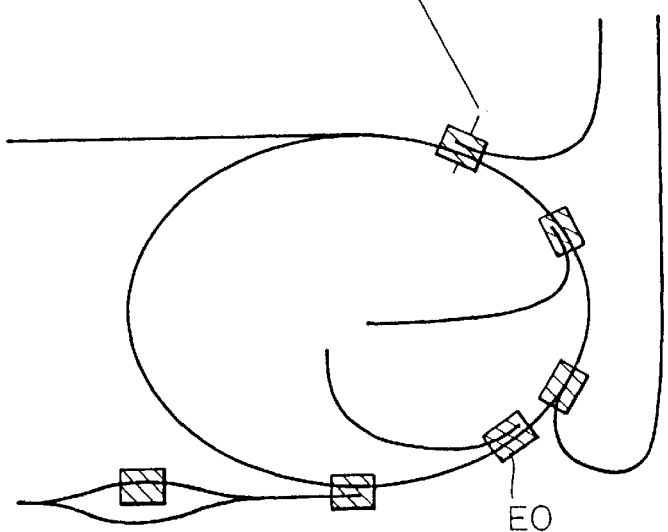
Fig.1(a)

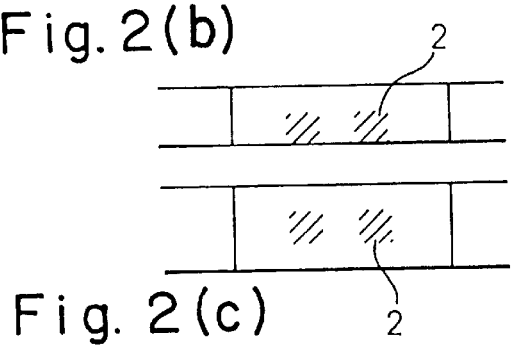
Fig. 2(b)   Fig. 2(d)
Fig. 2(c)   Fig. 2(e)
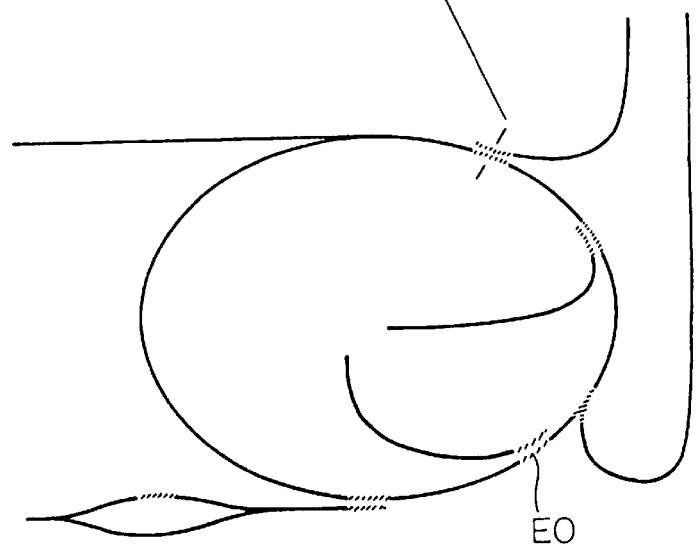
Fig. 2(a)

A

B

Fig. 10(a)
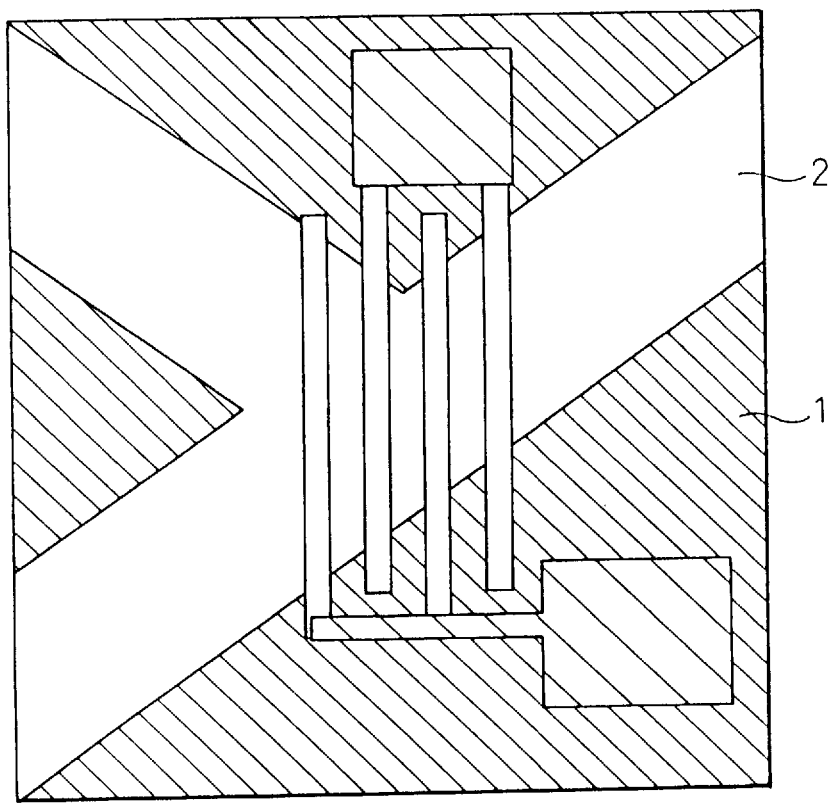
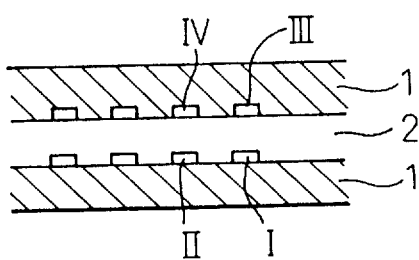
Fig. 10(b)

Fig.13(1)
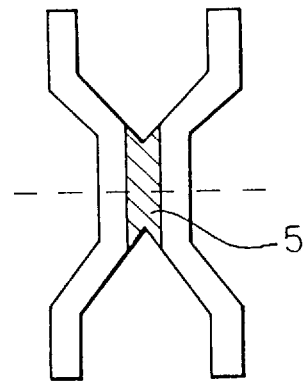
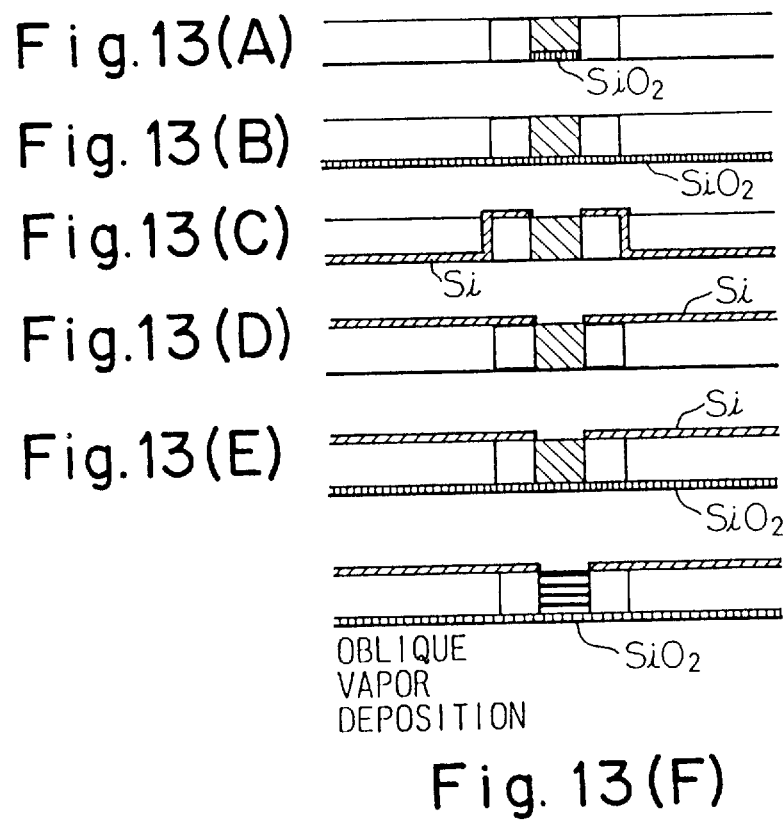
Fig.13(A)
Fig.13(B)
Fig.13(C)
Fig.13(D)
Fig.13(E)
Fig.13(F)

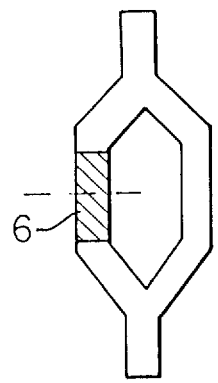
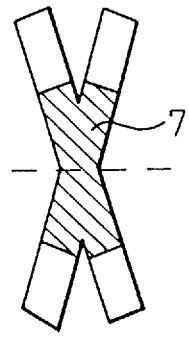
Fig. 14(1)   Fig. 14(2)
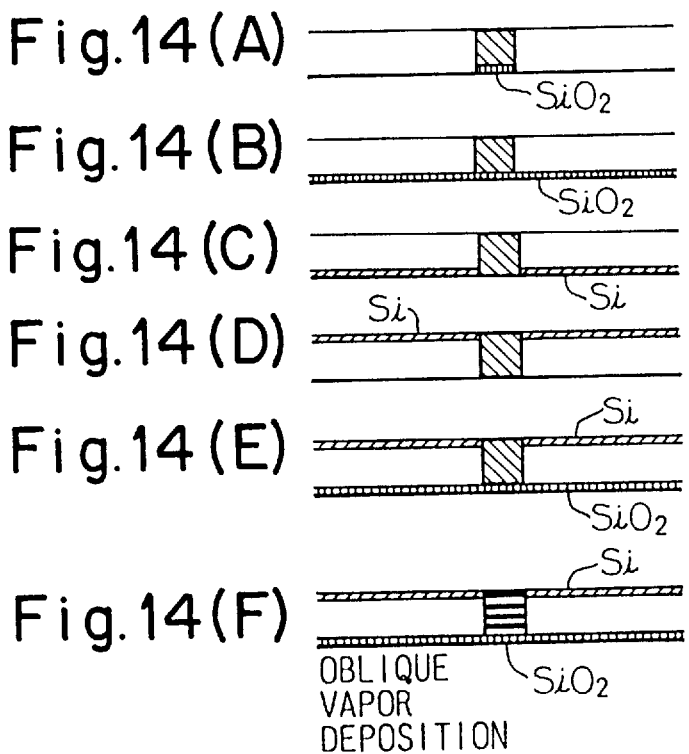
Fig.14(A)
Fig.14(B)
Fig.14(C)
Fig.14(D)
Fig.14(E)
Fig.14(F)
OBLIQUE VAPOR DEPOSITION

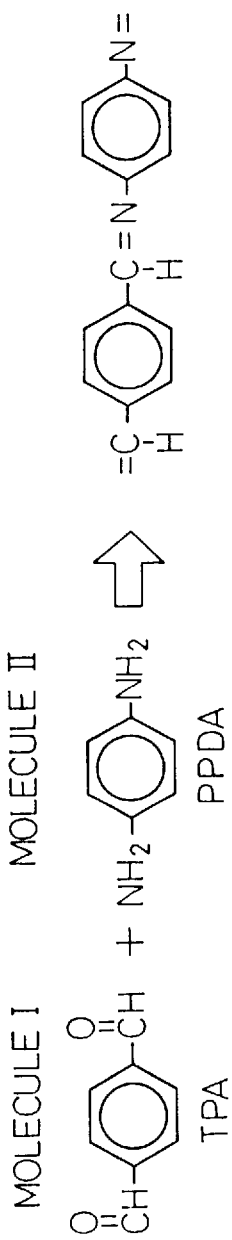
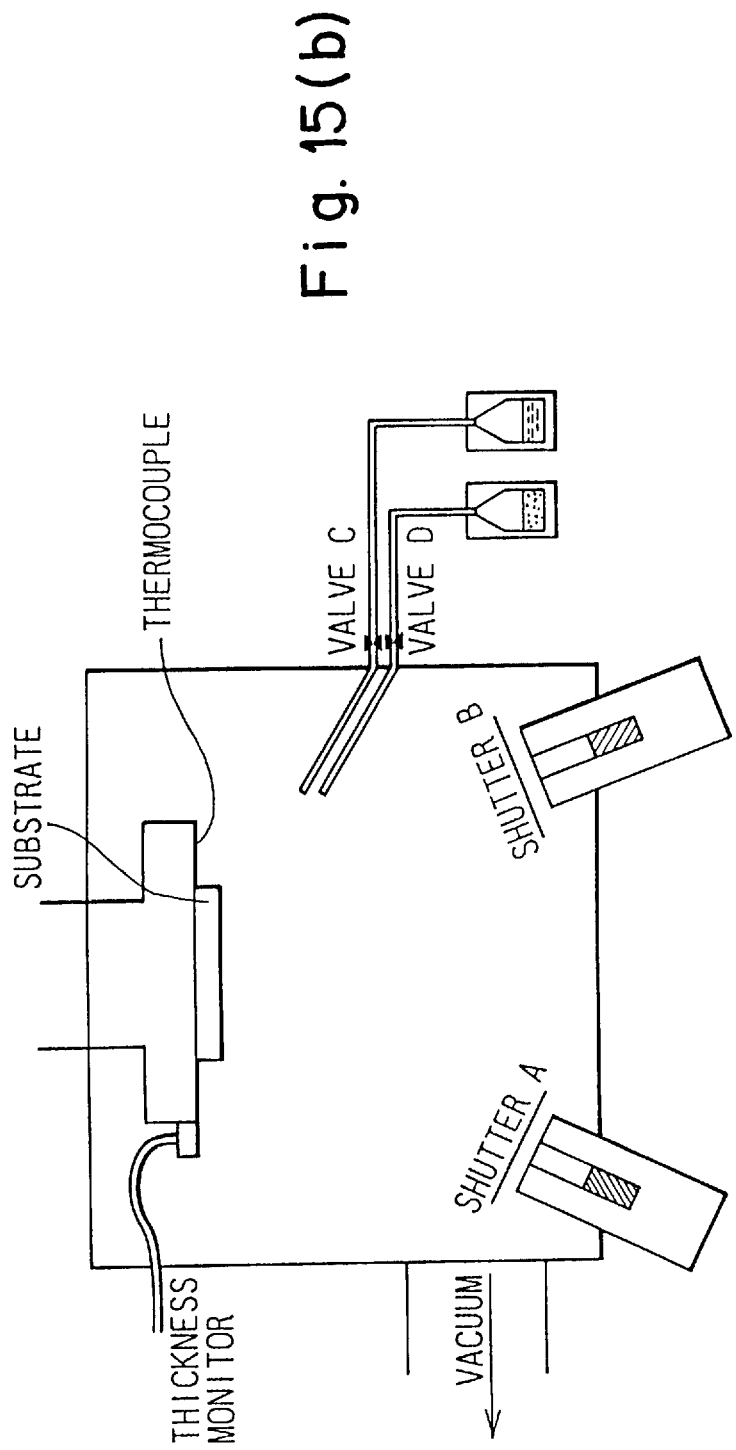
Fig. 15(a)
Fig. 15(b)

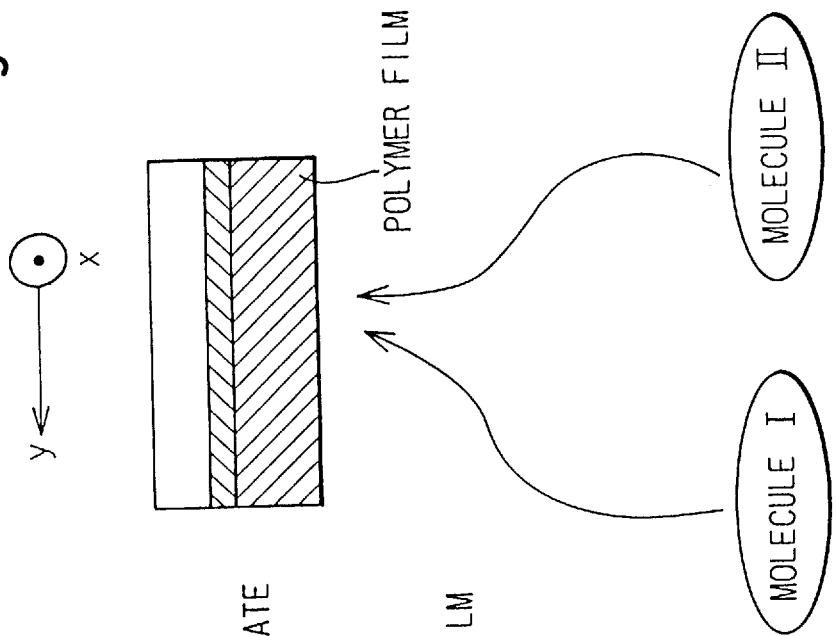
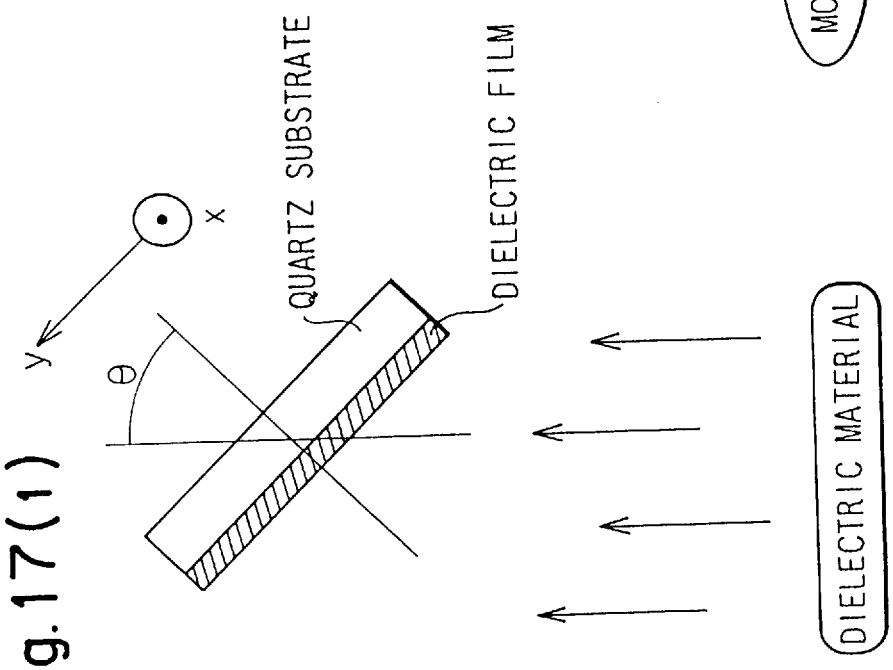

CUT FACE

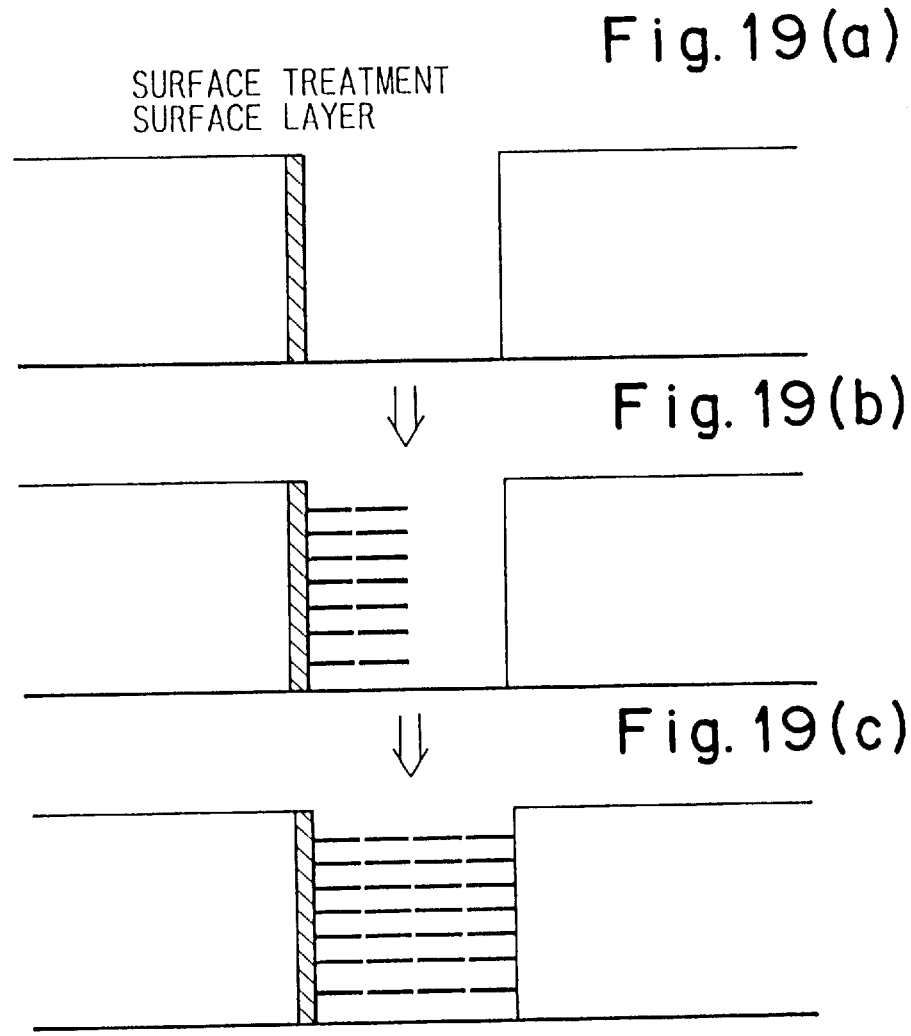

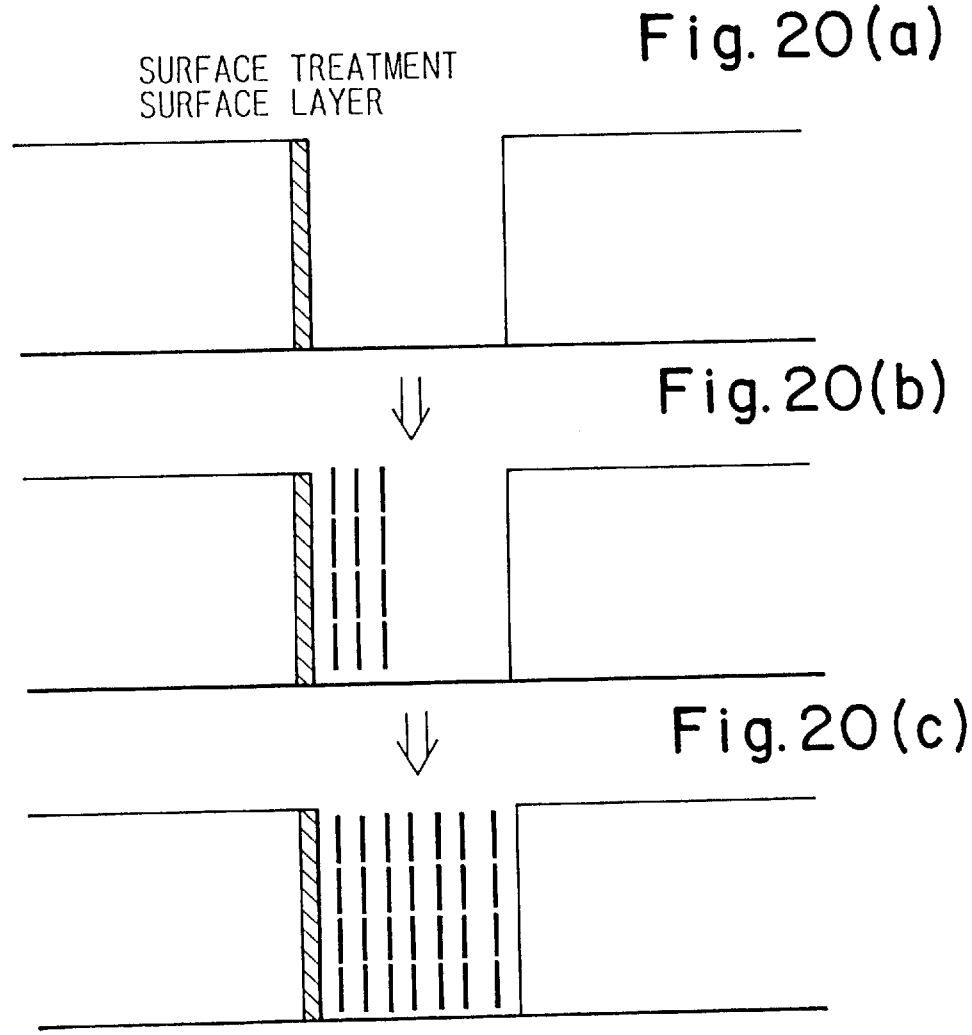

OPTICAL INTEGRATED CIRCUIT, OPTICAL CIRCUIT WAVEGUIDE DEVICE AND PROCESS FOR ORIENTED, SELECTIVE GROWTH AND FORMATION OF ORGANIC FILM

CROSS-REFERENCE TO RELATED APPLICATION

This is a continuation-in-part of application Ser. No. 08/028,550, now abandoned filed Mar. 8, 1993.

BACKGROUND OF THE INVENTION

1. Field of the Invention

The present invention relates to an optical integrated circuit, an optical circuit waveguide device, and a process for oriented, selective growth and formation of an organic film.

2. Description of Related Art

The fields of data processing and communications have brought dramatic progress in optical wiring and optical interconnection, and the permeation of optical technologies such as optical parallel processors, optical ATMs, Fiber to the Home, etc. is expected to develop further into the future. This will require various types of optical integrated circuits, including waveguide devices.

To this end there have been proposed and developed optical integrated circuits using non-linear optical waveguides and a variety of optical circuit devices such as matrix optical switches and optical switches, as well as processes for selective and oriented growth of organic films and processes for organic film formation which are required for their production.

The conventional techniques, however, have had their respective disadvantages, which are described below.

A. Optical integrated circuits using non-linear optical waveguides

Since non-linear optical materials have conventionally been used to form waveguide cores, it has only been possible to lower the propagation loss to about 0.5 dB/cm.

B. Optical circuit devices

Conventionally, it has been necessary to distance the electrodes from the core in order to lower absorption loss by the driving electrode, and this has complicated efforts to increase electric field application efficiency.

There has been a particular problem with grating-type devices and reflector-type devices, because reflection by the electrodes result in noise.

C. Matrix optical switches

Switching has conventionally been accomplished by direct input of light in the 1.3 μm and 1.5 μm wavelength bands. Resulting disadvantages include larger device sizes and restrictions on increased integration, and creation of bottlenecks in the optical coupling of the fibers, etc. with external devices.

D. Processes for selective and oriented growth of organic films and processes of organic film formation Since formation of underlying films onto flat substrates and surface treatment have been the conventional norm, there has not been adequate freedom of oriented growth.

In addition, since independent adjustment of gas pressure in CVD and MLD (Molecular Layer Deposition) is difficult to accomplish, stability in film formation has been another problem. Particularly in the case of MLD, the time required for replacement of the gases has resulted in slower film-forming rates.

SUMMARY OF THE INVENTION

The present invention is provided for the purpose of overcoming these disadvantages of the prior art, and its objects are the following.

A. Optical integrated circuits using non-linear optical waveguides

To realize optical integrated circuits with low propagation loss, by forming the basic network with a passive waveguide and placing non-linear optical materials and/or optical amplifier materials only on the necessary locations.

B. Optical circuit devices

To realize optical circuit devices such as grating-type devices and reflector-type devices with high electric field application efficiency and low noise, by using transparent electrodes and greatly reducing their refractive index effect.

C. Matrix optical switches

To accomplish O/E (optical/electrical) or E/O (electrical/optical) conversion of input and output and use shortwaves as the wavelength for switching, thus allowing reduction in device sizes and greater degrees of integration. Also, to allow easier optical coupling of fibers, etc. with external devices by optoelectrical conversion.

D. Processes for selective and oriented growth of organic films and processes of organic film formation To improve the freedom of oriented growth, through orientation of wall surfaces of irregular substrates or formation of underlying films on or surface treatment of the wall surfaces. Also, to allow easier control of gas pressure in CVD and MLD, and faster film-forming rates, by dividing the chamber into multiple regions, trapping a molecular gas into each region, and transporting the substrate or the regions.

In order to overcome the aforementioned problems, the present invention provides an optical integrated circuit which is characterized by having a waveguide network constructed with passive waveguides, and a functional material selectively positioned on the clad sections or core sections of the functional portion.

BRIEF DESCRIPTION OF THE DRAWINGS

FIGS. 1(a)–1(e) are schematic drawings of an embodiment of an optical integrated circuit according to the invention.

FIGS. 2(a)–2(e) are schematic drawings of another embodiment of an optical integrated circuit according to the invention.

FIGS. 10(a)–10(b) are schematic drawings of another embodiment of a grating-type optical switch according to the invention.

FIGS. 13(1) and 13(A)–13(F) are schematic drawings of an embodiment of an optical integrated circuit or optical circuit device according to the invention.

FIGS. 14(1)–(2) and 14(A)–14(F) are schematic drawings of another embodiment of an optical integrated circuit or optical circuit device according to the invention.

FIGS. 15(a)–15(b) are schematic drawings of an embodiment of a vapor deposition apparatus for vapor phase growth of a useful functional material according to the invention.

FIGS. 17(1)–(2) are schematic drawings of another embodiment of a $SiO_2$ oblique vapor deposition film for oriented growth of a useful functional material according to the invention.

FIGS. 19(a)–(c) schematic drawings which illustrates another embodiment of oriented growth of an organic film according to the invention.

FIGS. 20(a)–(c) are schematic drawings which illustrates yet another embodiment of oriented growth of an organic film according to the invention.

DESCRIPTION OF THE PREFERRED EMBODIMENTS

FIGS. 1 and 2 show embodiments of constructions of optical integrated circuits according to the invention. FIG. 1(a) is a construction wherein a waveguide network is constructed with passive waveguides, and a functional material is selectively positioned on the clad sections 1 of the functional portion. When a secondary or tertiary non-linear optical material is positioned on the branched or crossed section of an optical switch and the arm section of a Mach-Zehnder optical modulator, voltage-based optical control is possible. FIG. 2(a) is a construction wherein the waveguide network is constructed with passive waveguides, and a functional material is selectively positioned on the core sections 2 of the functional portion. When a secondary or tertiary non-linear optical material is positioned on the branched or crossed section of an optical switch and the arm section of a Mach-Zehnder optical modulator, voltage-based optical control is possible. According to this construction, the passive waveguide network may be given the functions of an optical switch, optical modulator, wavelength converter or tunable filter. When a tertiary non-linear optical material is used, optical control is possible by light instead of voltage.

Also, if a rare earth-doped material or fluorescent material is used as the functional material, optical amplifier or waveguide laser functions may be provided. With the construction described above, there is no limitation to these functions, as a variety of other functions such as that of an attenuator which works by absorption or a polarizing element which works by selective polarized light absorption, may also be provided.

Various possible forms are shown FIGS. 1(b)–(e) and FIGS. 2(b)–2(e) where the functional material is positioned so as to surround the top, bottom, left and right of the cores, the top, left and right of the cores, or only the left and right of the cores, or where it is positioned only between the cores.

Here, the vapor growth method used for formation of the waveguide cores or clads may be organic CVD, electric field assist CVD, MLD, vapor deposition polymerization, vapor deposition, organic MBD or organic MBE.

Figure 3:
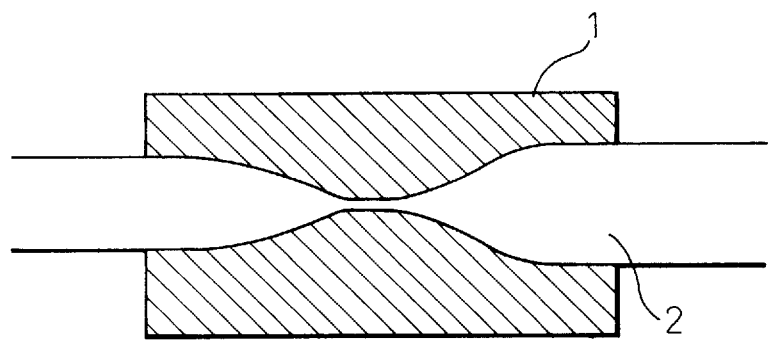
FIG. 3 is a schematic drawing of an embodiment of a waveguide construction employing the optical integrated circuit of FIG. 1.
Figure 4:
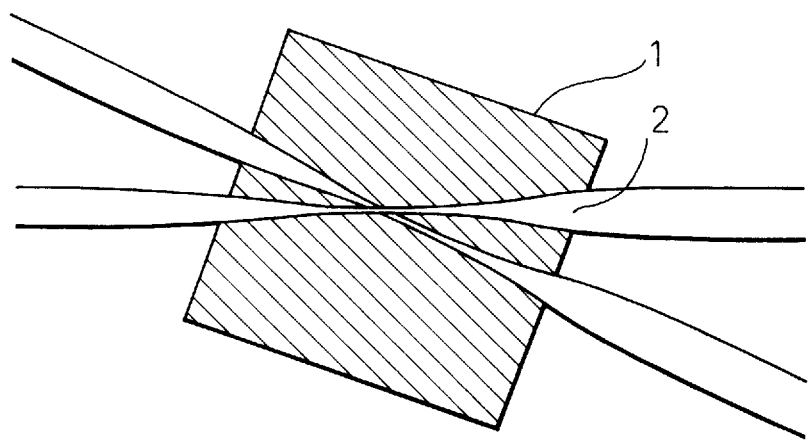
FIG. 4 is a schematic drawing of another embodiment of a waveguide construction employing the optical integrated circuit of FIG. 1.

As shown in FIGS. 3 and 4, the construction may be such that the core sections 2 are gradually narrowed or gradually widened along the direction of light propagation, in order to increase the light leakage into functional portion made of the non-linear material formed on the clad sections 1 of the passive waveguide, to thus improve the functionability.

According to the present invention described above, it is possible to realize an optical integrated circuit with lower propagation loss and greater functionability.

According to the invention, there is also provided an optical circuit device with a novel construction.

Figure 5:
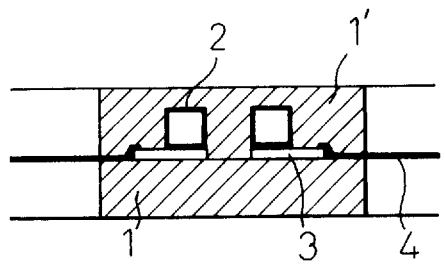
FIG. 5 is a schematic drawing of an embodiment of an electrode construction for an optical circuit device according to the invention.
Figure 6:
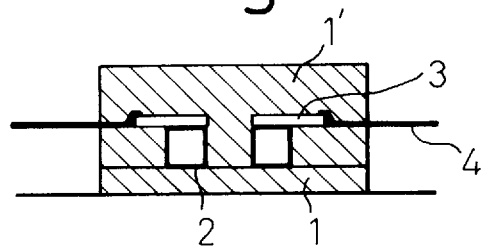
FIG. 6 is a schematic drawing of another embodiment of an electrode construction for an optical circuit device according to the invention.
Figure 7:
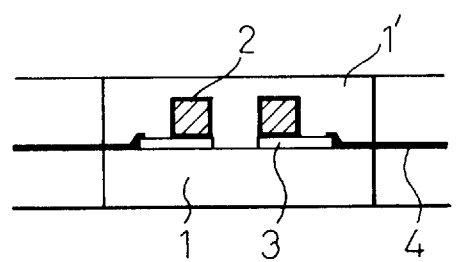
FIG. 7 is a schematic drawing of yet another embodiment of an electrode construction for an optical circuit device according to the invention.
Figure 8:
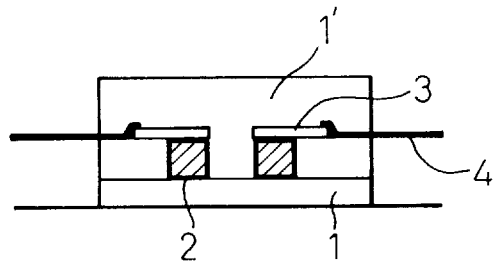
FIG. 8 is a schematic drawing of yet another embodiment of an electrode construction for an optical circuit device according to the invention.

FIGS. 5 to 8 show examples of electrode constructions for optical circuit devices according to the invention. FIGS. 5 and 7 show constructions wherein formation of a transparent electrode 3 on a clad layer 1, is followed by formation of a core layer 2. FIGS. 6 and 8 show constructions wherein formation of the transparent electrode 3 on the core layer 2 is followed by formation of the clad layer 1'. Other alternatives, which are not shown, include a construction wherein formation of the transparent electrode on a clad layer is followed by formation of a core layer, and then formation of another transparent electrode, a construction wherein formation of the transparent electrode is followed by formation of a core layer or clad layer, and a construction wherein formation of the transparent electrode is followed by formation of a core layer, and then formation of another electrode. Furthermore, the transparent electrode 3 may be positioned only on or near the optical path, with a metal electrode 4 positioned on the other sections, or a metal electrode 4 laid on the lead section and pad section. This provides a reduction in the electrode resistance of the circuit.

Here, the transparent electrode need not be transparent to the visible range, but only transparent to the wavelength used (for example, the 0.8 $\mu$m, 1.3 $\mu$m or 1.5 $\mu$m band).

The material used to construct the transparent electrode may be, for example, a metal oxide such as tin oxide, tin-added indium oxide or zinc oxide; a silicon-based material such as silicon or silicon carbide; a semiconductor compound such as gallium arsenide, gallium aluminum arsenide, cadmium telluride or cadmium sulfide; or an electrically conductive polymer.

Here as well, the waveguide core or clad may be formed by a vapor growth method such as organic CVD, electric field assist CVD, MLD, vapor deposition polymerization, vapor deposition, organic MBD or organic MBE. Such vapor growth methods may be very effectively used to form a non-linear optical material film after formation of the transparent electrode.

According to the invention as described above, it is possible to realize an optical circuit device with high electric field application efficiency and low propagation loss.

The present invention further provides a grating device and reflector device with a novel construction.

Figure 9A:
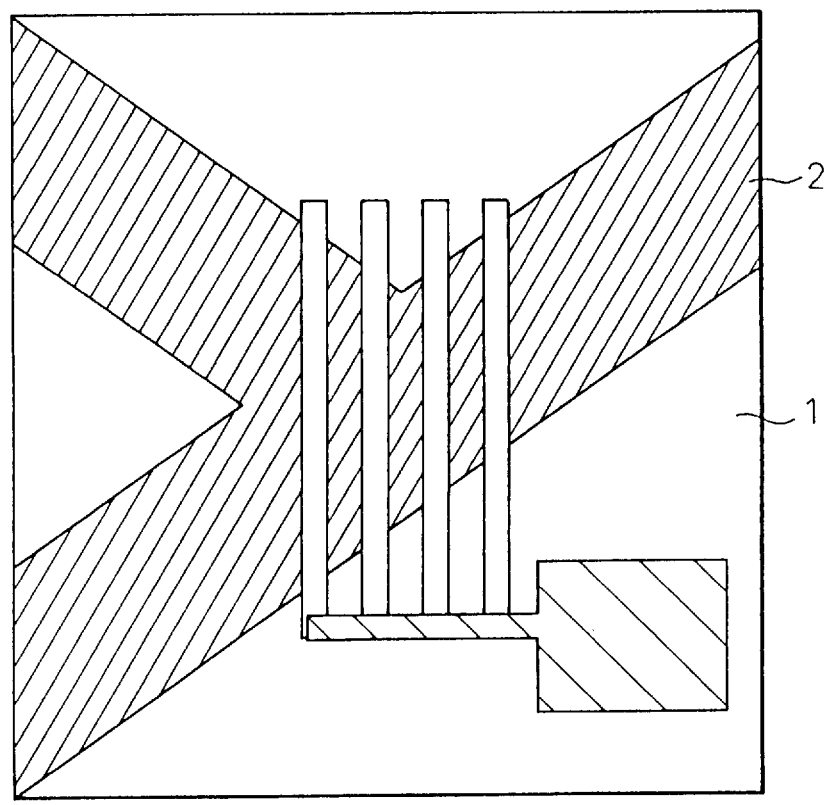
FIGS. 9(a)–9(c) are schematic drawings of an embodiment of a grating-type optical switch according to the invention.
Figure 9B:
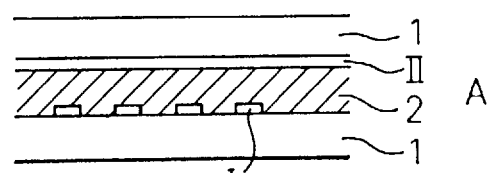
Figure 9C:
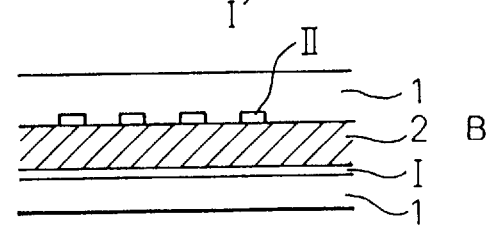

FIGS. 9 and 10 show examples of grating optical switches according to the invention. As shown in FIG. 9(a), formation of a grating-like transparent electrode I on a clad 1 is followed by formation of a core 2 made of a non-linear optical material, and then formation of a grating-like or plate-like transparent electrode II and finally formation of a clad 1. A voltage is applied between electrode I and electrode II, and this induces a refractive index change in the core for switching of the optical path (A) in FIG. 9(b); and. Alternatively, formation of a plate-like or grating-like transparent electrode I on a clad 1 is followed by formation of a core 2 made of a non-linear optical material, and then formation of a grating-like transparent electrode II and finally formation of a clad 1, and a voltage is applied between electrodes I and II to induce a refractive index change in the core for switching of the optical path (B) in FIG. 9(c). Here, in order to reduce the effect of the electrodes when no voltage is applied, the electrodes are preferably made as thin as possible (for example, 5000 Å or less), and the refractive index of electrode I and the refractive index of the non-linear optical material core, and the refractive index of electrode II and the refractive index of the clad are preferably as close as possible (for example, a refractive index difference of 0.01 or less).

Another construction is possible by formation of comb-like transparent electrodes I and II on a clad, followed by formation of a core made of a non-linear optical material, and then formation of a clad, with a voltage applied between the comb-like electrodes I and II to induce a refractive index change in the core for switching of the optical path (FIG. 10(a)). Here, in order to reduce the effect of the electrodes when no voltage is applied, the electrodes are preferably made as thin as possible (for example, 5000 Å or less), and the refractive indexes of electrodes I and II and the refractive index of the non-linear optical material core are preferably as close as possible (for example, a refractive index difference of 0.01 or less).

Another construction is possible by formation of a core made of a non-linear optical material on the clad, followed by formation of comb-like transparent electrodes I and II, and then formation of a clad, with a voltage applied between the electrodes I and II to induce a refractive index change in the core for switching of the optical path. Here as well, in order to reduce the effect of the electrodes when no voltage is applied, the electrodes are preferably made as thin as possible (for example, 5000 Å or less), and the refractive indexes of electrodes I and II and the refractive index of the non-linear optical material core are preferably as close as possible (for example, a refractive index difference of 0.01 or less).

Another construction is possible by formation of comb-like transparent electrodes I and II on a clad made of a non-linear optical material, followed by formation of a core, and then formation of a clad made of a non-linear optical material, with a voltage applied between the comb-like electrodes I and II to induce a refractive index change in the clad for switching of the optical path. Here as well, in order to reduce the effect of the electrodes when no voltage is applied, the electrodes are preferably made as thin as possible (for example, 5000 Å or less), and the refractive indexes of electrodes I and II and the refractive index of the non-linear optical material core are preferably as close as possible (for example, a refractive index difference of 0.01 or less).

Another construction is possible by formation of a core on a clad made of a non-linear optical material, followed by formation of comb-like transparent electrodes I and II, and then formation of a clad made of a non-linear optical material, with a voltage applied between the comb-like electrodes I and II to induce a refractive index change in the clad for switching of the optical path. Here as well, in order to reduce the effect of the electrodes when no voltage is applied, the electrodes are preferably made as thin as possible (for example, 5000 Å or less), and the refractive indexes of electrodes I and II and the refractive index of the non-linear optical material core are preferably as close as possible (for example, a refractive index difference of 0.01 or less).

Another construction, shown in FIG. 10(b), is possible by formation of comb-like transparent electrodes I and II on a clad made of a non-linear optical material, followed by formation of a core 2, formation of additional comb-like transparent electrodes III and IV, and then formation of a clad 1 made of a non-linear optical material, with a voltage applied between the comb-like electrodes I and II and/or III and IV to induce a refractive index change in the clad for switching of the optical path. Here as well, in order to reduce the effect of the electrodes when no voltage is applied, the electrodes are preferably made as thin as possible (for example, 5000 Å or less), and the refractive indexes of electrodes I and II and the refractive index of the core, and/or the refractive indexes of electrodes III and IV and the refractive index of the non-linear optical material clad, are preferably as close as possible (for example, a refractive index difference of 0.01 or less).

In the above-mentioned embodiment of the clad EO with comb-like electrodes, grating-like transparent electrodes may be formed instead of the comb-like electrodes, providing opposing electrodes across the clad layer through which the voltage is applied to induce a refractive index change in the clad for switching of the optical path.

In addition, in all of the embodiments described above, there may be a single grating-like electrode or a pair of comb-like electrodes, to realize a reflector optical switch.

Here as well, the waveguide core or clad may be formed by a vapor growth method such as organic CVD, electric field assist CVD, MLD, vapor deposition polymerization, vapor deposition, organic MBD or organic MBE.

The present invention further provides a matrix optical switch with a novel construction.

Figure 11:
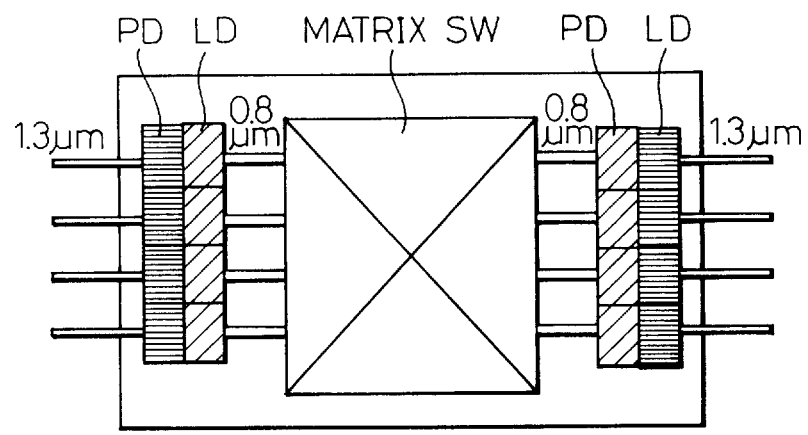
FIG. 11 is a schematic drawing of an embodiment of a matrix optical switch according to the invention.
Figure 12:
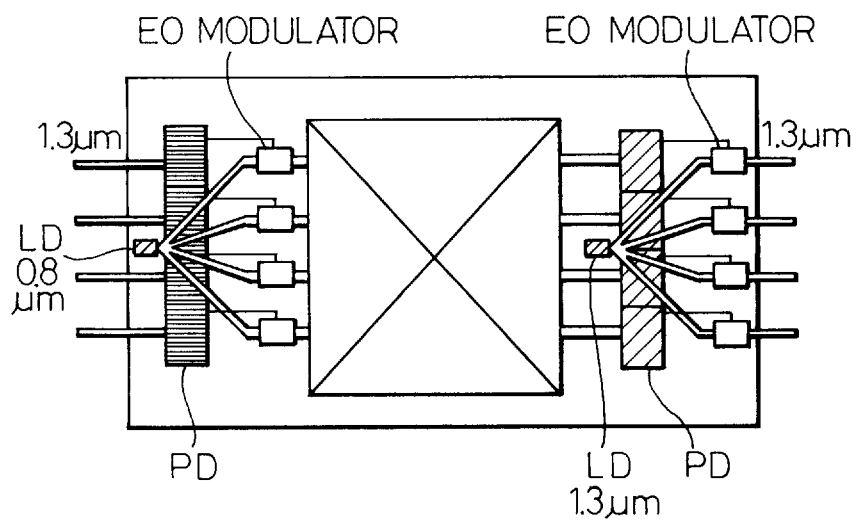
FIG. 12 is a schematic drawing of another embodiment of a matrix optical switch according to the invention.

FIGS. 11 and 12 are representations of matrix optical switches which convert input light into electricity with an optical/electrical converter element (O/E element), generate an optical signal from the electrical signal and introduce it into an optical waveguide, perform switching at a matrix optical switch, convert the light into electricity with an O/E element, generate an optical signal from the electrical signal, and output the optical signal. FIG. 11 is an example wherein optical signal generation is accomplished by LD direct modulation. For example, incident 1.3 $\mu$m light undergoes optical/electrical conversion at the PD, and this drives the LD to introduce 0.8 $\mu$m light into the waveguide. The light is switched at the matrix optical switch, and undergoes optical/electrical conversion at the PD, which drives the LD to emit 1.3 $\mu$m light. This allows downsizing of the matrix optical switch. FIG. 12 is an example wherein optical signal generation is accomplished by a monolithically incorporated electrical/optical modulator.

In the cases described above, the E/O conversion may be accomplished either at an optical/electrical converter device mounted in a hybrid manner, or at an optical/electrical converter device formed on a semiconductor substrate or a semiconductor film grown on a substrate.

The present invention further provides an optical integrated circuit and optical circuit device obtained by selective growth of an organic film.

FIGS. 13 and 14 show examples of optical integrated circuits or optical circuit devices in which a film is placed, or surface treatment is performed, so as to promote growth of a functional material on desired functional material growth regions, and the functional material is selectively grown by vapor growth on a portion of the clad layer or core layer. Here, a vapor deposition apparatus such as shown in FIG. 15(b) can be used for selective growth of a polyazomethine-based material such as indicated in FIG. 15(a), on, for example, the center section 5 of a directional coupler as shown in FIG. 13(1), or an arm section 6 of a Mach-Zehnder optical modulator as shown in FIG. 14(1) or the crossed section 7 of an optical switch as shown in FIG. 14(2) (see Japanese Patent Application No. 3-132448). Since such materials tend to selectively grow on $SiO_2$, growth on desired regions is possible by preparing $SiO_2$ films on those regions, as shown in FIGS. 13 and 14(A, B). Conversely, by preparing a film which inhibits growth, such as Si, growth may be promoted on the other regions as shown in FIGS. 13 and 14(C, D).

A film may also be placed, or surface treatment performed, so as to promote growth of a functional material on desired growth regions, while also placing a film, or performing surface treatment, so as to inhibit growth of the functional material on regions other than the desired growth regions as shown in FIGS. 13 and 14(E).

Figure 16:
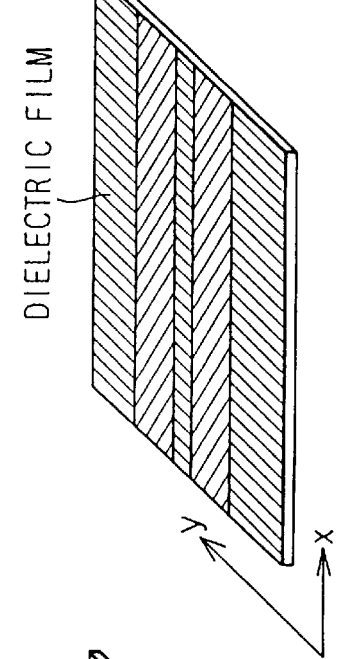
FIGS. 16(1)–(4) are schematic drawings of an embodiment of a $SiO_2$ oblique vapor deposition film for oriented growth of a useful functional material according to the invention.
Figure 16:
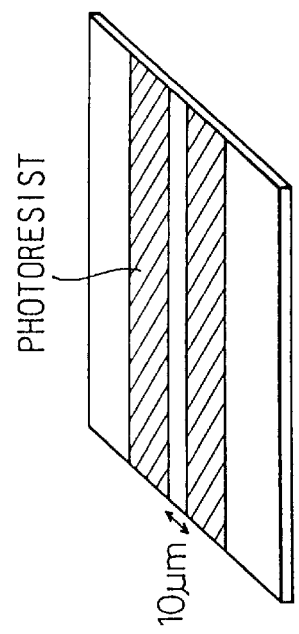
Figure 16:
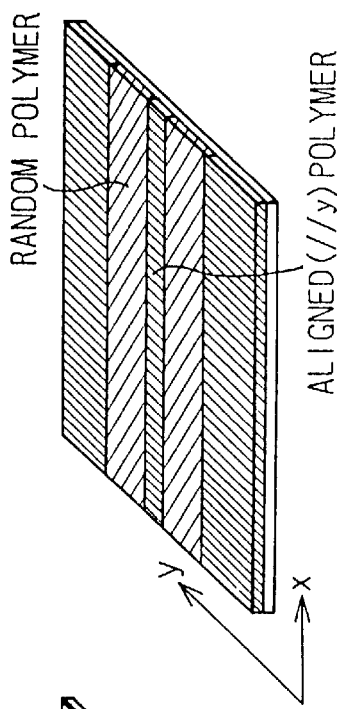
Figure 16:
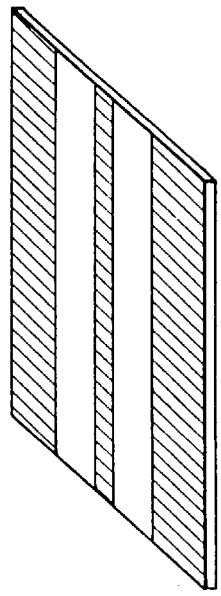

In addition, the film or surface treatment to promote growth of the functional material may also control the orientation of the functional material film as shown in FIGS. 13 and 14(F). This is possible with a $SiO_2$ oblique vapor deposition film (see Japanese Patent Application No. 4-48961) or rubbing film, such as shown for example in FIGS. 16(1)–(4) and 17(1)–(2).

The growth regions may be at any location, but representative examples thereof include the clad, waveguide gap or core sections of a directional coupler device, the clad or core sections of a Mach-Zehnder device, and the clad or core sections of a crossed or branched device.

Here as well, the waveguide core or clad may be formed by a vapor growth method such as organic CVD, electric field assist CVD, MLD, vapor deposition polymerization, vapor deposition, organic MBD or organic MBE.

The present invention further provides a process for oriented growth of organic films.

Figure 18A:
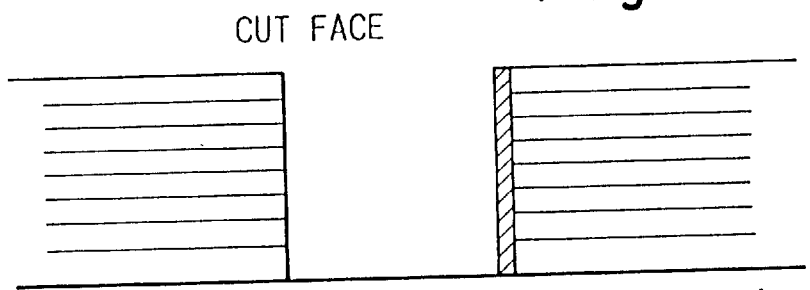
FIGS. 18(a)–(c) are schematic drawings which illustrates an embodiment of oriented growth of an organic film according to the invention.
Figure 18B:
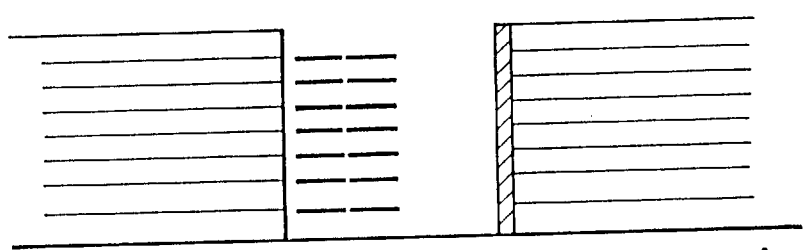
Figure 18C:
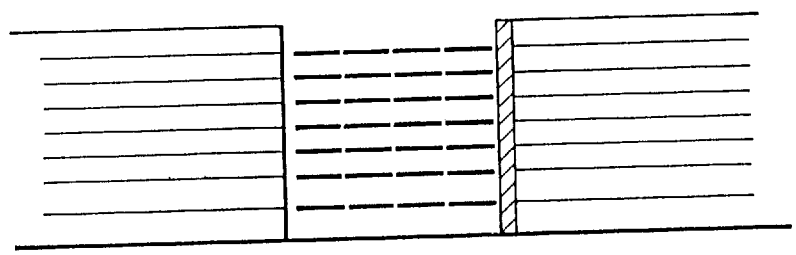

FIGS. 18 to 20 show, respectively, an example of organic film growth wherein a recess is formed on a polymer film by etching, cutting, laser ablation or the like FIGS. 18–20(a), and the orientation of the polymer exposed on the walls of the recess results in selective oriented growth of the organic film (FIG. 18(b)–18(c)); (Here, one of the side walls is covered with a film growth-inhibiting layer), an example of selective growth of an organic film by placing a film, or performing surface treatment, to promote growth of the organic film on the side wall of the recess of the film (FIG. 19(b)–(c));, and an example of further controlling the orientation of the organic film by placing a film, or performing surface treatment, to promote growth of the organic film (FIGS. 20(b)–(c)) (In this example, treatment is performed on the left wall, and film growth proceeds from left to right).

Here as well, the waveguide core or clad may be formed by a vapor growth method such as organic CVD, electric field assist CVD, MLD, vapor deposition polymerization, vapor deposition, organic MBD or organic MBE.

The present invention further provides a process for forming an organic film.

Figure 21:
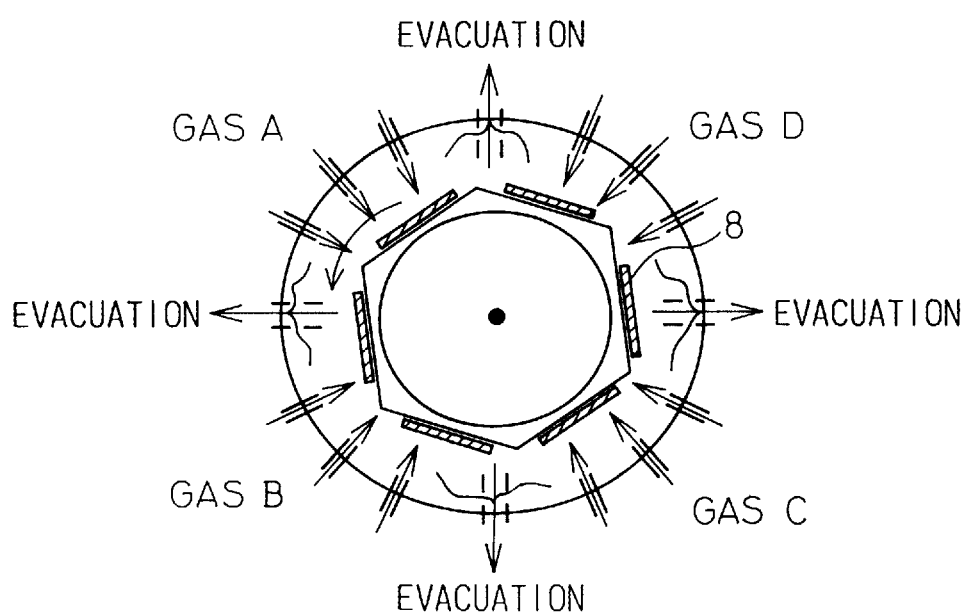
FIG. 21 is a schematic drawing which illustrates an organic film formation process according to the invention.

FIG. 21 is an example of a process for rapid vapor phase film formation by organic CVD, MLD, etc. The chamber is divided into multiple regions, a molecular gas is introduced into each region while being discharged near the borders with the other regions to set the concentration of said molecular gas higher than the other regions, and the substrate 8 is transported through the chamber or said region is transported across the substrate, to grow an organic film on the substrate. This allows the substrate surface to be rapidly exposed to each molecular gas without exchanging the gas, thus allowing more rapid growth of the film. Molecular gases which may be used in such a process include those described in, for example, Japanese Patent Application Nos. 3-132448 and 3-239559.

As explained above, the present invention provides the following excellent effects:

A. Optical integrated circuits with low propagation loss are realized by forming the basic network with a passive waveguide and placing a non-linear optical material or optical amplifier material only on the necessary locations.

B. Optical circuit devices such as grating-type devices and reflector-type devices with high electric field application efficiency and low noise are realized by using transparent electrodes and greatly reducing their refractive index effect.

C. Reduction in device sizes and greater degrees of integration as well as easier optical coupling of fibers, etc. with external devices through optical/electrical conversion, is possible by performing E/O or O/E conversion of input and output and using shortwaves as the wavelength for switching.

D. The freedom of oriented growth is improved by orientation of polymers on wall surfaces of irregular substrates or formation of underlying films on or surface treatment of the wall surfaces. Easier control of gas pressure in organic CVD or MLD and faster film-forming rates are also made possible by dividing the chamber into multiple regions, trapping a molecular gas into each region, and transporting the substrate or the regions.

We claim:

1. An optical integrated circuit comprising:
a waveguide network is constructed of waveguides including a core section, a clad section and electrodes, and a non-linear optical material is positioned on predetermined portions of said clad section of a functional portion of the waveguide, wherein the functional portion of the waveguide is selected from optical switches, optical modulators, wavelength converter elements and tunable filters, and the non-linear optical material is a secondary or tertiary non-linear optical material.

2. An optical integrated circuit comprising:
a waveguide network is constructed of waveguides including a core section, a clad section and electrodes, and a non-linear optical material is positioned on predetermined portions of said core section of a functional portion of the waveguide, wherein the functional portion of the waveguide is selected from optical switches, optical modulators, wavelength converter elements and tunable filters, and the non-linear optical material is a secondary or tertiary non-linear optical material.

3. An optical integrated circuit according to claim 1 or 2, wherein at least a portion of the non-linear optical material is obtained by a vapor growth method.

4. An optical integrated circuit according to claim 3, wherein the vapor growth method is selected from organic CVD, electric field assist CVD, MLD, vapor deposition polymerization, vapor deposition, organic MBD and organic MBE.

5. An optical integrated circuit comprising:

a waveguide network is constructed of waveguides including a core section, a clad section and electrodes, and a non-linear optical material is positioned on predetermined portions of said clad section of a functional portion of the waveguide, wherein the functional portion of the waveguide is an optical amplifier, and the non-linear optical material is selected from rare earth-doped materials and fluorescent materials.

6. An optical circuit waveguide device comprising:

a clad layer;

a transparent electrode formed on said clad layer; and a core layer formed on said transparent electrode, wherein said optical circuit waveguide device is a switch in which said core layer is provided in said clad layer and parallel with said clad layer.

7. An optical circuit waveguide device comprising:

a core layer;

a transparent electrode formed on said core layer; and a clad layer formed on the transparent electrode, wherein said optical circuit waveguide device is a switch in which said core layer is provided in said clad layer and parallel with the clad layer.

8. An optical circuit waveguide device comprising:

a clad layer;

a first transparent electrode formed on the clad layer;

a core layer formed on the first transparent electrode; and a second transparent electrode formed on the core layer, wherein said optical circuit waveguide device is a switch in which said core layer is provided in said clad layer and parallel with said clad layer.

9. An optical circuit waveguide device comprising:

a clad;

a transparent electrode; and a core layer formed on the transparent electrode, wherein said optical circuit waveguide device is a switch in which said core layer is provided in said clad and parallel with said clad.

10. An optical circuit waveguide device comprising:

a core;

a transparent electrode; and a clad layer formed on the transparent electrode, wherein said optical circuit waveguide device is a switch in which said core is provided in said clad layer and parallel with said clad layer.

11. An optical circuit waveguide device comprising:

a clad;

a first transparent electrode;

a core layer formed on the first transparent electrode; and a second transparent electrode formed on the core layer, wherein said optical circuit waveguide device is a switch in which said core layer is provided in said clad and parallel with said clad.

12. An optical circuit waveguide device according to any of claims 6 to 11, wherein the transparent electrode is positioned on or near an optical path of the optical circuit waveguide device, and a metal electrode is positioned on other sections or a metal electrode is laid on a lead section and pad section.

13. An optical circuit waveguide device according to any of claims 6 to 11, wherein the transparent electrode is made of a material selected from metal oxides such as tin oxide, tin-added indium oxide and zinc oxide; silicon-based materials such as silicon and silicon carbide; semiconductor compounds such as gallium arsenide, gallium aluminum arsenide, cadmium telluride and cadmium sulfide; and electrically conductive polymers.

14. An optical switch comprising:

a clad;

a grating-like transparent electrode I formed on said clad;

a core made of a non-linear optical material formed on said electrode I;

a grating- or plate-like transparent electrode II formed on said core; and a clad formed on said electrode II, wherein application of a voltage between the electrodes I and II induces a refractive index change in the core to switch the optical path.

15. An optical switch comprising:

a clad;

a plate- or grating-like transparent electrode I formed on the clad;

a core made of a non-linear optical material formed on the transparent electrode I;

a grating-like transparent electrode II formed on the core; and a clad formed on the transparent electrode II, wherein application of a voltage between the electrodes I and II induces a refractive index change in the core to switch the optical path.

16. An optical switch comprising:

a first clad;

comb-like transparent electrodes I and II formed on the first clad;

a core made of a non-linear optical material formed on the transparent electrodes I and II; and a second clad formed on the core, wherein application of a voltage between the electrodes I and II induces a refractive index change in the core to switch the optical path.

17. An optical switch comprising:

a first clad;

a core made of a non-linear optical material formed on the first clad;

comb-like transparent electrodes I and II formed on the core and;

a second clad formed on the transparent electrodes I and II, wherein application of a voltage between the electrodes I and II induces a refractive index change in the core to switch the optical path.

18. An optical switch comprising:

a first clad made of a non-linear optical material;

comb-like transparent electrodes I and II formed on the first clad made of a non-linear optical material;

a core formed on the transparent electrodes I and II; and a second clad made of a non-linear optical material formed on the core, wherein application of a voltage between the electrodes I and II induces a refractive index change in the clad to switch the optical path.

19. An optical switch comprising:
a first clad made of a non-linear optical material;
a core formed on the first clad made of a non-linear optical material;
comb-like transparent electrodes I and II formed on the core; and
a second clad made of non-linear optical material formed on the transparent electrodes I and II, wherein application of a voltage between the electrodes I and II induces a refractive index change in the clad to switch the optical path.

20. An optical switch comprising:
a first clad made of a non-linear optical material;
comb-like transparent electrodes I and II formed on the first clad made of a non-linear optical material;
a core formed on the transparent electrodes I and II;
comb-like transparent electrodes III and IV formed on the core; and
a second clad made of a non-linear optical material formed on the transparent electrodes III and IV, wherein application of a voltage between the electrodes I and II and/or the electrodes III and IV induces a refractive index change in the clad to switch the optical path.

21. An optical switch according to any of claims 16 to 20, wherein grating-like transparent electrodes are formed instead of the comb-like transparent electrodes, opposing electrodes are provided across the clad layer, and application of a voltage between the transparent electrodes and the opposing electrodes induces a refractive index change in the clad to switch the optical path.

22. A reflective optical switch according to any of claims 14 to 20, wherein a single grating-like transparent electrode is present or a pair of comb-like transparent electrodes are present.

23. An optical switch according to any of claims 14 to 20, wherein the difference in the refractive index of the grating-like transparent electrode formed on the clad and that of the core, or the difference in the refractive index of the comb-like transparent electrodes formed on the clad and that of the core, or the difference in the refractive index of the grating-like transparent electrode formed on the core and that of the clad, or the difference in the refractive index of the comb-like transparent electrodes formed on the core and that of the clad is less than 0.01.

24. An optical switch according to any of claims 14 to 20, wherein the thickness of the grating-like transparent electrode or the comb-like transparent electrodes is 5000 Å or lower.

25. An optical switch according to any of claims 14 to 20, wherein at least a portion of the non-linear optical material is obtained by a vapor growth method.

26. An optical switch according to claim 25, wherein the vapor growth method is selected from organic CVD, electric field assist CVD, MLD, vapor deposition polymerization, vapor deposition, organic MBD and organic MBE.

27. A matrix optical switch comprising:
a converter for converting input light into an electrical signal with an optical/electrical converter element (O/E element);
an optical signal generator for generating an optical signal from the electrical signal and for introducing the optical signal into an optical waveguide;
a switch for switching the optical signal with a matrix optical switch;
a converter for converting the optical signal into an electrical signal with an O/E element;
means for generating an optical signal from the electrical signal; and
an output element for outputting the optical signal.

28. A matrix optical switch according to claim 27, wherein the optical signal is generated by LD direct modulation.

29. A matrix optical switch according to claim 27, wherein the optical signal is generated by an electrooptical modulator array monolithically incorporated into the substrate.

30. A matrix optical switch according to claim 27, wherein the O/E conversion is accomplished with an optical/electrical converter device mounted in a hybrid manner.

31. A matrix optical switch according to claim 27, wherein the O/E conversion is accomplished with an optical/electrical conversion element formed on a semiconductor substrate or a semiconductor film grown on a substrate.

32. A matrix optical switch according to claim 27, wherein the wavelength of the input light and the wavelength of the switched light, and/or the wavelength of the output light and the wavelength of the switched light, are different.

33. An optical integrated circuit or optical circuit device comprising:
a clad layer or core layer; and
a non-linear optical material grown on desired functional material growth regions of the clad layer or core layer by placement of a film thereon or performing surface thereabout thereon, and the non-linear optical material is selectively grown by vapor growth on the portion of the clad layer or core layer.

34. An optical integrated circuit or optical circuit device comprising:
a clad layer or core layer; and
a non-linear optical material grown on a portion of the clad layer or core layer which form desired functional material growth regions while inhibiting growth of the non-linear optical material on regions other than desired functional material growth regions by placement of a film or performing surface treatment on the clad layer or core layer, and the non-linear optical material is selectively grown by vapor growth of the portion of the clad layer or core layer.

35. An optical integrated circuit or optical circuit device comprising:
a clad layer or a core layer;
a non-linear optical material grown on a portion of the clad layer or core layer which forms desired functional material growth regions, while inhibiting growth of the non-linear optical material on regions other than said functional material growth regions by placement of a film thereon or performing surface treatment thereon, and the non-linear optical material is selectively grown by vapor growth on the portion of the clad layer or core layer.

36. An optical integrated circuit or optical circuit device according to any of claims 33 to 35, wherein the film or surface treatment to promote growth of the functional material also control the orientation of the functional material film.

37. An optical integrated circuit or optical circuit device according to claim 36, wherein the film to promote growth of the functional material is a dielectric oblique vapor deposition film.

38. An optical integrated circuit or optical circuit device according to claim 36, wherein the film to promote growth of the functional material is a rubbing film.

39. An optical integrated circuit or optical circuit device according to any of claims 33 to 36, wherein the desired functional material growth regions are the clad sections, waveguide gap sections or core sections of a directional coupler device, the clad sections or core sections of a Mach-Zehnder device, or the clad sections or core sections of a crossed or branched device.

40. An organic film growth process comprising the steps of forming a recess on a polymer film and causing selective oriented growth of an organic film based on the orientation of the polymer exposed on walls of the recess.

41. An organic film growth process according to claim 40, wherein the recess of the polymer film is formed by a means selected from etching, cutting and laser ablation.

42. An organic film growth process comprising the steps of forming a recess on a film and selectively growing an organic film by placing a film, or performing surface treatment, so as to promote growth of the organic film on recess walls of the film.

43. An organic film growth process according to claim 42, wherein the film or surface treatment to promote growth of the organic film also controls the orientation of the organic film.

44. An organic film growth process according to any of claims 40 to 43, wherein at least a portion of the organic film is formed by a vapor growth method.

45. An organic film growth process according to claim 44, wherein the vapor growth method is selected from organic CVD, electric field assist CVD, MLD, vapor deposition polymerization, vapor deposition, organic MBD and organic MBE.

46. A process for forming an organic film, characterized in that when organic CVD or MLD is performed, the chamber is divided into multiple regions, a molecular gas is introduced into each region while being discharged near the borders with the other regions to set the concentration of said molecular gas higher than the other regions, and the substrate is transported through the chamber or said region is transported across the substrate to grow an organic film on the substrate.

47. A process for forming an organic film according to claim 46, wherein at least a portion of the organic film is formed by a vapor growth method.

48. A process for forming an organic film according to claim 47, wherein the vapor growth method is selected from organic CVD, electric field assist CVD, MLD, vapor deposition polymerization, vapor deposition, organic MBD and organic MBE.

49. An optical integrated circuit comprising:
a waveguide network is constructed of waveguides including a core section, a clad section and electrodes, and a non-linear optical material is positioned on predetermined portions of said core section of a functional portion of the waveguide, wherein the functional portion of the waveguide is an optical amplifier, and the non-linear optical material is selected from rare earth-doped materials and fluorescent materials.

50. An optical integrated circuit according to claim 2, wherein the core section of the functional portion is gradually narrowed or gradually widened along a direction of light propagation.

* * * * *

UNITED STATES PATENT AND TRADEMARK OFFICE
CERTIFICATE OF CORRECTION

PATENT NO. : 5,818,983

DATED : October 6, 1998

INVENTOR(S) : Yoshimura et al.

It is certified that error appears in the above-identified patent and that said Letters Patent is hereby corrected as shown below:

```
Column 1, line 10, after "08/028,550," and before "filed"

delete "now abandoned"
```

Signed and Sealed this

Thirtieth Day of March, 1999

*Attest:*

Q. TODD DICKINSON

*Attesting Officer*     *Acting Commissioner of Patents and Trademarks*